United States Patent
Yao et al.

(10) Patent No.: US 11,541,775 B2
(45) Date of Patent: Jan. 3, 2023

(54) BATTERY STATE OF CHARGE ESTIMATION SYSTEM FOR A HYBRID/ELECTRIC VEHICLE

(71) Applicant: FORD GLOBAL TECHNOLOGIES, LLC, Dearborn, MI (US)

(72) Inventors: Yixin Yao, Ann Arbor, MI (US); Xiaohong Duan, Canton, MI (US); Mark Steven Yamazaki, Canton, MI (US); Richard Dyche Anderson, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 385 days.

(21) Appl. No.: 16/781,346

(22) Filed: Feb. 4, 2020

(65) Prior Publication Data

US 2021/0237614 A1 Aug. 5, 2021

(51) Int. Cl.
*B60L 9/00* (2019.01)
*B60L 58/12* (2019.01)
*B60L 15/20* (2006.01)
*G06N 3/04* (2006.01)
*G06N 3/08* (2006.01)

(52) U.S. Cl.
CPC .............. *B60L 58/12* (2019.02); *B60L 15/20* (2013.01); *G06N 3/04* (2013.01); *G06N 3/08* (2013.01); *B60L 2240/547* (2013.01)

(58) Field of Classification Search
USPC .................... 701/22; 324/426, 430
See application file for complete search history.

(56) References Cited

U.S. PATENT DOCUMENTS

| | | | |
|---|---|---|---|
| 2008/0091363 A1* | 4/2008 | Lim | H02J 7/0029 324/426 |
| 2009/0112495 A1* | 4/2009 | Center | G01R 31/392 903/903 |
| 2014/0125259 A1* | 5/2014 | Knight | G01R 31/3842 324/430 |
| 2015/0263561 A1 | 9/2015 | Kharrat et al. | |
| 2015/0263563 A1 | 9/2015 | Kharrat et al. | |
| 2016/0332630 A1 | 11/2016 | Shinohara et al. | |
| 2018/0246173 A1* | 8/2018 | Singh | G01R 31/392 |

FOREIGN PATENT DOCUMENTS

| | | | | |
|---|---|---|---|---|
| CN | 104002813 A | * | 8/2014 | ............ B60W 10/02 |
| CN | 105717460 B | * | 5/2018 | ........... G01R 31/387 |
| DE | 102015202514 A1 | * | 8/2015 | ............ B60W 10/06 |
| DE | 102015202540 A1 | * | 8/2015 | .......... B60L 11/1862 |
| EP | 1777794 A2 | * | 4/2007 | .......... B60L 11/1861 |

* cited by examiner

*Primary Examiner* — Brian Ngo
(74) *Attorney, Agent, or Firm* — David B Kelley; Brooks Kushman P.C.

(57) ABSTRACT

A vehicle includes a battery, an electric machine, and a controller. The battery has a state of charge. The electric machine is configured to draw electrical power from the battery to propel the vehicle in response to an acceleration request and to deliver electrical power to the battery to recharge the battery. The controller is programmed to adjust an estimation of battery state of charge based on a feed forward control that includes a coulomb counting algorithm, a first feedback control that includes a first battery model, and a second feedback control that includes a second battery model. The controller is further programmed to control the electrical power flow between the battery and the electric machine based on the estimation of the state of charge of the battery.

18 Claims, 3 Drawing Sheets

BATTERY STATE OF CHARGE ESTIMATION SYSTEM FOR A HYBRID/ELECTRIC VEHICLE

TECHNICAL FIELD

The present disclosure relates to hybrid/electric vehicles and control systems for hybrid/electric vehicles.

BACKGROUND

Hybrid/electric vehicles may include an electric battery that is configured to deliver electric power to an electric machine that is configured to propel the vehicle.

SUMMARY

A vehicle includes a battery, an electric machine, and a controller. The battery has a state of charge. The electric machine is configured to draw electrical power from the battery to propel the vehicle in response to an acceleration request and to deliver electrical power to the battery to recharge the battery. The controller is programmed to adjust an estimation of the battery state of charge based on a feed forward control, wherein the feed forward control includes a coulomb counting algorithm that adjusts the estimation of the state of charge of the battery based on a measured current flowing in and out of the battery. The controller is further programmed to adjust the estimation of the battery state of charge based on a first feedback control that includes a first battery model that outputs a first estimated voltage of the battery based on a current state of charge of the battery, wherein the first feedback control adjusts the estimation of the battery state of charge based on a difference between a measured voltage of the battery and the first estimated voltage of the battery. The controller is further programmed to adjust the estimation of the battery state of charge based on a second feedback control that includes a second battery model that outputs a second estimated voltage of the battery based on the current state of charge of the battery, a temperature of the battery, and the measured current flowing in and out of the battery, wherein the second feedback control adjusts the estimation of the battery state of charge based on a difference between the first estimated voltage of the battery and the second estimated voltage of the battery. The controller is further programmed to control the electrical power flow between the battery and the electric machine based on the state of charge of the battery.

A vehicle includes a battery, an electric machine, and a controller. The battery has a state of charge. The electric machine is configured to draw electrical power from the battery to propel the vehicle in response to an acceleration request and to deliver electrical power to the battery to recharge the battery. The controller is programmed to adjust an estimation of battery state of charge according to a feed forward control that adjusts the estimation of the state of charge of the battery based on a measured current flowing in and out of the battery. The controller is further programmed to adjust the estimation of the battery state of charge based on a first feedback control that adjusts the estimation of the battery state of charge based on a difference between a measured voltage of the battery and a first estimated voltage of the battery. The controller is further programmed to adjust the estimation of the battery state of charge based on a second feedback control that adjusts the estimation of the battery state of charge based on a difference between the first estimated voltage of the battery and a second estimated voltage of the battery. The controller is further programmed to control the electrical power flow between the battery and the electric machine based on the estimation of the state of charge of the battery.

A vehicle includes a battery, an electric machine, and a controller. The battery has a state of charge. The electric machine is configured to draw electrical power from the battery to propel the vehicle in response to an acceleration request and to deliver electrical power to the battery to recharge the battery. The controller is programmed to adjust an estimation of the battery state of charge based on a feed forward control that includes a coulomb counting algorithm, a first feedback control that includes a first battery model, and a second feedback control that includes a second battery model. The controller is further programmed to control the electrical power flow between the battery and the electric machine based on the estimation of the state of charge of the battery.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
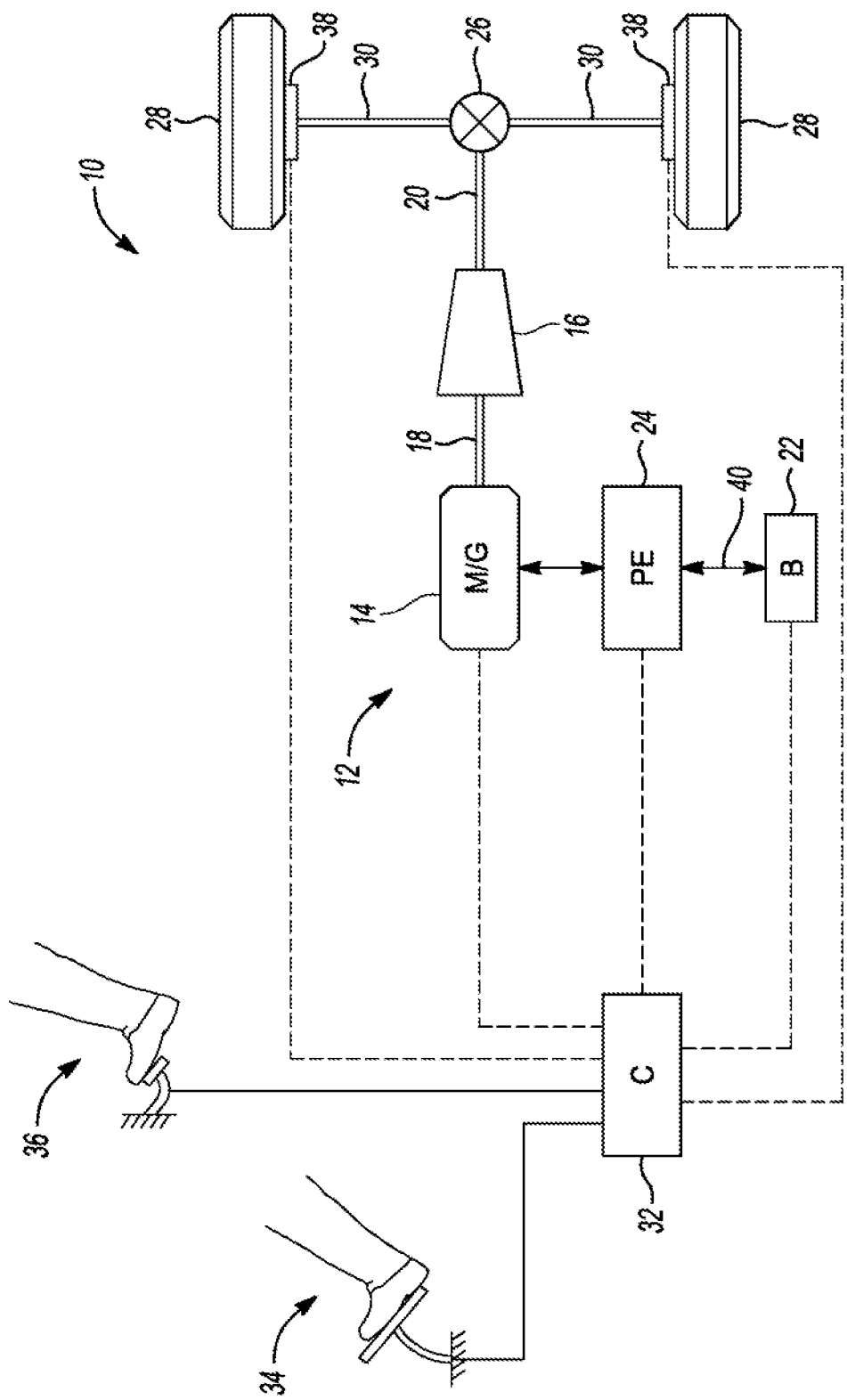
FIG. 1 is a schematic illustration of a representative powertrain of an electric vehicle.

Referring to FIG. 1, a schematic diagram of an electric vehicle 10 is illustrated according to an embodiment of the present disclosure. FIG. 1 illustrates representative relationships among the components. Physical placement and orientation of the components within the vehicle may vary. The electric vehicle 10 includes a powertrain 12. The powertrain 12 includes an electric machine such as an electric motor/generator (M/G) 14 that drives a transmission (or gearbox) 16. More specifically, the M/G 14 may be rotatably connected to an input shaft 18 of the transmission 16. The transmission 16 may be placed in PRNDSL (park, reverse, neutral, drive, sport, low) via a transmission range selector (not shown). The transmission 16 may have a fixed gearing relationship that provides a single gear ratio between the input shaft 18 and an output shaft 20 of the transmission 16. A torque converter (not shown) or a launch clutch (not shown) may be disposed between the M/G 14 and the transmission 16. Alternatively, the transmission 16 may be a multiple step-ratio automatic transmission. An associated traction battery 22 is configured to deliver electrical power to or receive electrical power from the M/G 14.

The M/G 14 is a drive source for the electric vehicle 10 that is configured to propel the electric vehicle 10. The M/G 14 is configured to draw electrical power from the battery 22 to propel the vehicle 10 in response to an acceleration request, which may be processed by a controller. The M/G 14 is also configured to deliver electrical power to the battery 22 to recharge the battery 22, which may occur during regenerative braking or during periods where another power source, such as an engine, is powering the M/G 14. The M/G 14 may be implemented by any one of a plurality of types of electric machines. For example, M/G 14 may be a permanent magnet synchronous motor. Power electronics 24 condition direct current (DC) power provided by the battery 22 to the requirements of the M/G 14, as will be described below. For example, the power electronics 24 may provide three phase alternating current (AC) to the M/G 14.

If the transmission 16 is a multiple step-ratio automatic transmission, the transmission 16 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between the transmission output shaft 20 and the transmission input shaft 18. The transmission 16 is automatically shifted from one ratio to another based on various vehicle and ambient operating conditions by an associated controller, such as a powertrain control unit (PCU). Power and torque from the M/G 14 may be delivered to and received by transmission 16. The transmission 16 then provides powertrain output power and torque to output shaft 20.

It should be understood that the hydraulically controlled transmission 16, which may be coupled with a torque converter (not shown), is but one example of a gearbox or transmission arrangement; any multiple ratio gearbox that accepts input torque(s) from a power source (e.g., M/G 14) and then provides torque to an output shaft (e.g., output shaft 20) at the different ratios is acceptable for use with embodiments of the present disclosure. For example, the transmission 16 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 20 is connected to a differential 26. The differential 26 drives a pair of drive wheels 28 via respective axles 30 connected to the differential 26. The differential 26 transmits approximately equal torque to each wheel 28 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 32 such as a powertrain control unit (PCU). While illustrated as one controller, the controller 32 may be part of a larger control system and may be controlled by various other controllers throughout the vehicle 10, such as a vehicle system controller (VSC). It should therefore be understood that the powertrain control unit 32 and one or more other controllers can collectively be referred to as a "controller" that controls various actuators in response to signals from various sensors to control functions such as operating the M/G 14 to provide wheel torque or charge the battery 22, select or schedule transmission shifts, etc. Controller 32 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 32 communicates with various vehicle sensors and actuators via an input/output (L/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 32 may communicate signals to and/or receive signals from the M/G 14, battery 22, transmission 16, power electronics 24, and any another component of the powertrain 12 that may be included, but is not shown in FIG. 1 (i.e., a launch clutch that may be disposed between the M/G 14 and the transmission 16. Although not explicitly illustrated, those of ordinary skill in the art will recognize various functions or components that may be controlled by controller 32 within each of the subsystems identified above. Representative examples of parameters, systems, and/or components that may be directly or indirectly actuated using control logic and/or algorithms executed by the controller 32 include front-end accessory drive (FEAD) components such as an alternator, air conditioning compressor, battery charging or discharging, regenerative braking, M/G 14 operation, clutch pressures for the transmission gearbox 16 or any other clutch that is part of the powertrain 12, and the like. Sensors communicating input through the I/O interface may be used to indicate wheel speeds (WS1, WS2), vehicle speed (VSS), coolant temperature (ECT), accelerator pedal position (PPS), ignition switch position (IGN), ambient air temperature (e.g., ambient air temperature sensor), transmission gear, ratio, or mode, transmission oil temperature (TOT), transmission input and output speed, acceleration or shift mode (MDE), battery temperature, voltage, current, or state of charge (SOC) for example.

Control logic or functions performed by controller 32 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle and/or powertrain controller, such as controller 32. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 34 is used by the driver of the vehicle to provide a demanded torque, power, or drive command to the powertrain 12 (or more specifically M/G 14) to propel the vehicle. In general, depressing and releasing the accelerator pedal 34 generates an accelerator pedal position signal that may be interpreted by the controller 32 as a demand for increased power or decreased power, respectively. A brake pedal 36 is also used by the driver of the vehicle to provide a demanded braking torque to slow the vehicle. In general, depressing and releasing the brake pedal 36 generates a brake pedal position signal that may be interpreted by the controller 32 as a demand to decrease the vehicle speed. Based upon inputs from the accelerator pedal 34 and brake pedal 36, the controller 32 commands the torque and/or power to the M/G 14, and friction brakes 38. The controller 32 also controls the timing of gear shifts within the transmission 16.

The M/G 14 may act as a motor and provide a driving fore for the powertrain 12. To drive the vehicle with the M/G 14 the traction battery 22 transmits stored electrical energy through wiring 40 to the power electronics 24 that may include an inverter, for example. The power electronics 24 convert DC voltage from the battery 22 into AC voltage to be used by the M/G 14. The controller 32 commands the power electronics 24 to convert voltage from the battery 22 to an AC voltage provided to the M/G 14 to provide positive or negative torque to the input shaft 18.

The M/G 14 may also act as a generator and convert kinetic energy from the powertrain 12 into electric energy to be stored in the battery 22. More specifically, the M/G 14 may act as a generator during times of regenerative braking in which torque and rotational (or kinetic) energy from the spinning wheels 28 is transferred back through the transmission 16 and is converted into electrical energy for storage in the battery 22.

It should be understood that the schematic illustrated in FIG. 1 is merely representative and is not intended to be limiting. Other configurations are contemplated without deviating from the scope of the disclosure. It should be understood that the vehicle configuration described herein is merely exemplary and is not intended to be limited. Other electric or hybrid electric vehicle configurations should be construed as disclosed herein. Other electric or hybrid vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

In hybrid configurations that include an internal combustion engine such as a gasoline, diesel, or natural gas powered engine, or a fuel cell, the controller 32 may be configured to control various parameters of such an internal combustion engine. Representative examples of internal combustion parameters, systems, and/or components that may be directly or indirectly actuated using control logic and/or algorithms executed by the controller 32 include fuel injection timing, rate, and duration, throttle valve position, spark plug ignition timing (for spark-ignition engines), intake/exhaust valve timing and duration, etc. Sensors communicating input through the I/O interface from such an internal combustion engine to the controller 32 may be used to indicate turbocharger boost pressure, crankshaft position (PIP), engine rotational speed (RPM), intake manifold pressure (MAP), throttle valve position (TP), exhaust gas oxygen (EGO) or other exhaust gas component concentration or presence, intake air flow (MAF), etc.

It should be understood that the vehicle configuration described herein is merely exemplary and is not intended to be limited. Other electric, or hybrid vehicle configurations should be construed as disclosed herein. Other vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

Hybrid electrical vehicles and electrical vehicles (xEVs) depended on traction batteries to provide power for propulsion and to recuperate energy. To achieve optimum vehicle performance and fuel economy, an accurate estimation for the state of charge (SOC) and the capacity of the battery is desired.

Estimating the battery SOC and capacity may be accomplished via several approaches. Battery SOC and capacity estimation methods for Lithium-ion batteries SOC may include the direct discharge method, the coulomb-counting (Ampere-Hour counting) method, the electrochemical and equivalent circuit model based method, and data-oriented methods.

Without considering the specific battery model, the coulomb counting method calculates the integration of charge or discharge current i(t) of the battery 22 over time to estimate the battery SOC, which is expressed by the continuous time coulomb counting equation, which is represented as equation (1):

$$SOC(t) = SOC(t_0) + \frac{\int_{t_0}^{t_2} i(t)dt}{Q(t)} \tag{1}$$

where SOC(t) is the state of charge of the battery 22 at time t, SOC(to) is the initial value of the state of charge of the battery SOC(t), i(t) is the measurable current flowing through the battery 22, and Q(t) is the present nominal capacity of the battery 22.

The Coulomb Counting Equation (1) can be expressed as a discrete form, which may be represented as equation (2):

$$SOC(t) = SOC(t-1) + \frac{\Delta Ti(t)}{Q(t)} \qquad (2)$$

where ΔT is the sampling time. Although the coulomb counting method may be simple and easy to implement, it requires prior knowledge of the initial SOC of the battery 22.

Using the coulomb counting method to estimate the battery SOC depends on current integration, the accurateness of the estimated battery SOC is affected by the initial value of the battery SOC, the precision of measured current being output from the battery, the charge/discharge coulomb efficiencies of the battery, and the battery capacity value. The variation of the battery capacity, the error in the measured current being input/output from the battery, and charge/discharge coulomb efficiency error of the battery and its variation may cause the estimated SOC to diverge from the actual SOC of the battery, and the divergence between the estimated SOC value and the actual SOC of the battery may increase over time. To correct the error in the estimated battery SOC that accumulated over a previous drive cycle and to obtain the correct value of an initial battery SOC in the vehicle, the measured battery voltage at the vehicle startup is used as the open circuit voltage (OCV) when the predetermined conditions are satisfied. The OCV is then used to derive an initial estimated SOC of the battery. When the predetermined conditions to update the initial estimated SOC are not satisfied, in some use cases such as a long idle time or a short parked time, the initial estimated SOC value will not be corrected with the existing control methods, which will further contribute to errors in the estimated SOC of the battery during a new drive cycle.

To provide more robust estimates and real-time applications, battery models, in particular, equivalent circuit models (ECMs) based battery SOC estimation methods may be used. First order and second order circuit resistor-capacitor (RC) models may be used for their simple characteristics. The dynamic equations of such circuits include the open circuit voltage (OCV) of the battery. Therefore, the Model-Based method is an indirect method because it uses the relationship between the battery OCV and the battery SOC to provide the estimation.

Data-oriented (data drive) methods, such as a nonlinear autoregressive network with exogenous inputs (NARX) neural network, adaptive network fuzzy interference system (ANFIS), etc., may be utilized to estimate the SOC by treating the battery as a black-box system. These methods often produce a good estimation of the SOC of the battery 22 due to the powerful ability to approximate nonlinear functions. However, the learning process may be computational and complex. In particular, target data of the model is needed in the train process, and the storage size may be high.

To overcome the limitations of a specific method, the tendency of the approaches has been oriented toward a mixture of different battery SOC estimation methods. As estimated SOC from coulomb counting may generate an error due to an integration accumulation error and/or an initial SOC estimation. To compensate for the error in the estimated SOC that may occur in coulomb counting method, a combined battery SOC estimation method including the coulomb counting and equivalent circuit model model-based approach may be used.

Another important factor that affects SOC estimation for a battery in a hybrid/electric vehicle is the battery capacity, which varies with battery life. The battery capacity may be estimated when the battery is operated to a specified discharge depth (SOC variation range), i.e., the battery capacity is more accurately estimated when the battery is operated within a wide charge/discharge range. For higher range hybrid/electric vehicles, estimating the battery capacity becomes less accurate when the battery is operated within a narrow or shallow charge/discharge range.

This disclosure includes a system to estimate the state of charge (SOC) and capacity of a battery used in hybrid/electric vehicles. A unique integrated battery SOC estimation system that is able to deal with complex nonlinear and uncertainty of battery is proposed. The proposed system includes a coulomb counting based feedforward loop, a first feedback loop based on a battery model whose parameters are estimated online to correct an initial error and integration accumulation error of the estimated SOC obtained from coulomb counting based feedforward loop, and a second feedback loop based on a pre-defined battery model that is utilized to further correct the error of SOC estimation caused by the online estimated battery model. The proposed system improves the precision of estimating the battery SOC and capacity by dealing with uncertainty and nonlinearity of battery based on the double feedback control system architecture.

Figure 2:
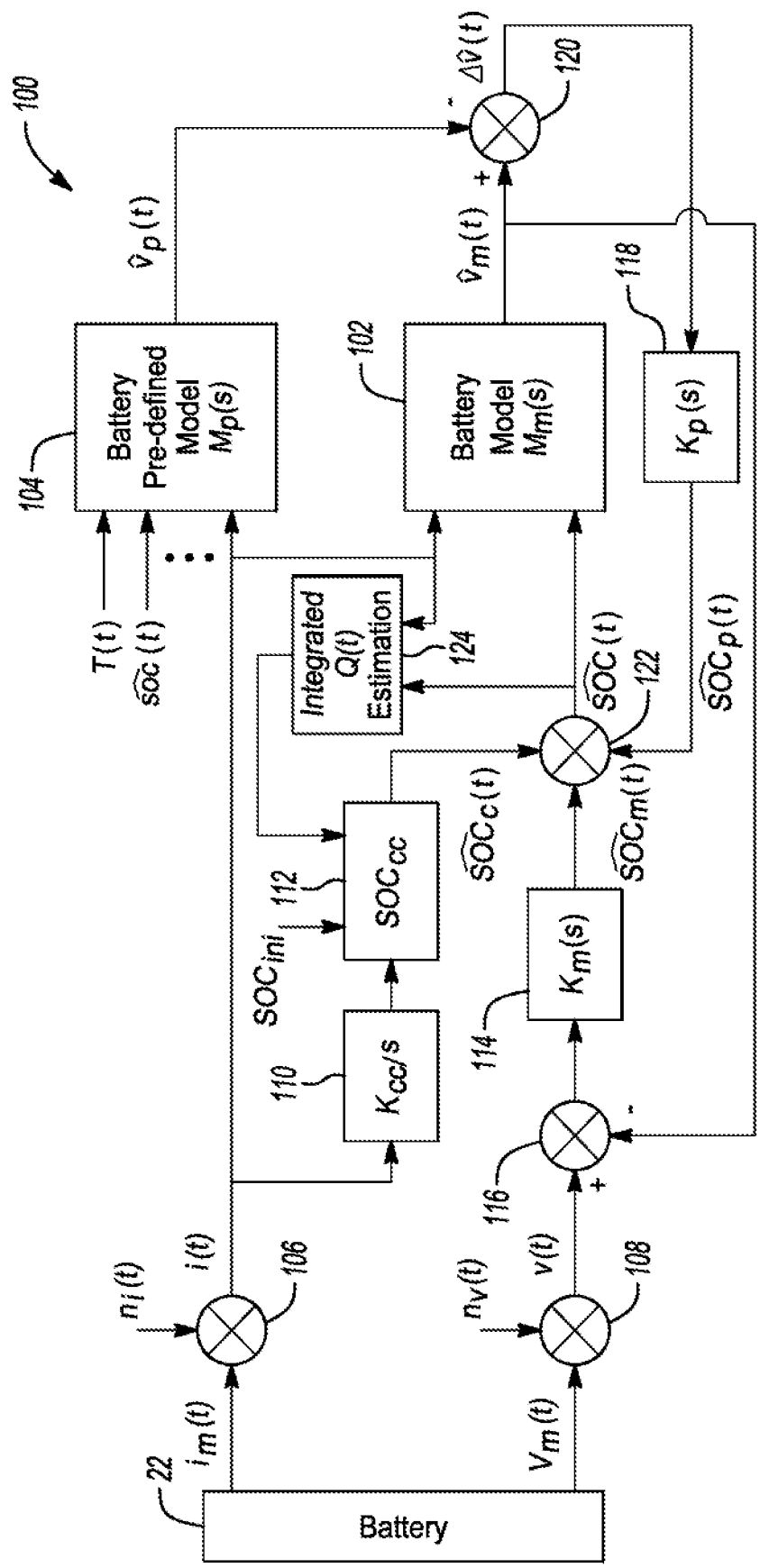
FIG. 2 is a block diagram illustrating a control system for estimating the state of charge and the capacity in a vehicle battery.

Referring to FIG. 2, a block diagram of a control system 100 for estimating the state of charge and the capacity of a vehicle battery (e.g., battery 22) is illustrated. The control system 100 includes two types of battery models that are used to estimate the SOC of the vehicle battery 22. The first model is an online battery model 102, where some of the battery parameters are estimated online and in-vehicle during vehicle operation based on measured values or inputs/outputs from the physical battery 22. The parameters of the online battery model 102 can be estimated by using different online algorithms, such as a Kalman filter. The second model is a pre-calibrated battery model 104, where the battery parameters are calibrated offline. The pre-calibrated battery model 104 may include a multitude of inputs to develop an accurate battery model. For example, the pre-calibrated battery model 104 may be developed based on a machine learning based neural network model, such as a NARX (nonlinear autoregressive network with exogenous variables) model that is trained by using test data. The pre-calibrated battery model 104 could also be a simplified model based on a physical model with the calibrated parameters, a math model, or any other type of model that is calibrated with test data. In the control system 100, the online battery model 102 and the pre-calibrated battery model 104 may be battery cell models, battery module models, or battery pack models. Mixed model structures may also be used. For example, the pre-calibrated battery model 104 may be a battery pack model and the online battery model 102 may be a battery cell model, or vice versa.

The current i(t) and voltage v(t) of the battery 22 are adjusted measured values that may be determined via sensors. The current i(t) and voltage v(t) of the battery 22 may be based on an actual measured current $i_m(t)$ and an actual measured voltage $v_m(t)$ of the battery 22, which are each adjusted by $n_i(t)$ and $n_v(t)$, respectively, at nodes 106 and 108, respectively, to account for noise and offset values. The measured battery current i(t) and voltage v(t) of the battery 22 are functions of with time. It should be noted that that any variable described herein that is followed by a "t" in parenthesis is a function of time. An estimated SOC of the battery: $\widehat{SOC}_{c\_c}(t)$ may be obtained from a coulomb counting algorithm at block 110 and by taking into account an initial state of charge of the battery $SOC_{ini}$ at block 112. The input to block 110 is the measured current i(t) of the battery 22, which is adjusted by the coulomb counting algorithm, $K_{cc}/s$, at block 110. "cc" represents a "coulomb-counting" calculation, which is an integration calculation that utilizes the measured battery current i(t) to obtain the estimated SOC of the battery $\widehat{soc}_{t\_c}(t)$. $K_{cc}$ is a pure gain value in the feedforward loop (i.e., from i(t) to $\widehat{soc}_{t\_c}(t)$ via blocks 110 and 112) and 1/s is the integration in the form of s in the complex domain. Therefore, $K_{cc}$ may be the rate or slop of an integration math calculation.

The first feedback loop consists of the online battery model 102, which may be represented by transfer function Mm(s), and an associated feedback controller 114, which may be represented by transfer function Km(s). Controller 114 may be a P, PI, or PID controller. Controller 114 could be any type of controller, but practically it is not necessary for controller 114 to be complex. The output of the online battery model 102 is an estimated terminal voltage $\hat{v}_m(t)$ of the battery 22, which is fed into the input of the first feedback loop. The difference between the estimated terminal voltage $\hat{v}_m(t)$ of the battery 22 that is output from the online battery model 102 and the measured terminal voltage v(t) is determined at subtraction block 116, which is then input into and processed by controller 114 to generate a first correction factor $\widehat{soc}_{t\_c}(t)$ to the estimated SOC of the battery. The estimated SOC $\widehat{soc}_{t\_c}(t)$ obtained from coulomb counting calculation is regarded as a forward input for this feedback loop.

The second feedback loop consists of the pre-calibrated battery model 104, which may be represented by transfer function $M_p(s)$, and an associated feedback controller 118, which may be represented by transfer function, $K_p(s)$. The output of the pre-calibrated battery model 104 is an estimated output voltage $\hat{v}_p(t)$ of the battery 22. The difference between the estimated voltage $\hat{v}_m(t)$ of the battery 22 that is output from the online battery model 102 and the estimated voltage $\hat{v}_p(t)$ of the battery 22 that is output from the pre-calibrated battery model 104 is determined at subtraction block 120. This difference may be referred to as the feedback error and is defined as $\Delta\hat{v}(t)=\hat{v}_m(t)-\hat{v}_p(t)$. The feedback error $\Delta\hat{v}(t)$ is then input into and processed by controller 118 to generate a second correction facto $\widehat{soc}_{t\_p}(t)$. Controller 118 may be a gain in the second feedback loop that operates to reduce the error between $\hat{v}_p(t)$ and $\hat{v}_m(t)$ (i.e., $\Delta\hat{v}(t)$). It may be a constant value, a look-up table, a P controller, a PI controller, or a PID controller. Controller 118 could be any type of controller, but practically it is not necessary for controller 118 to be complex.

The correction factors $\widehat{soc}_{t\_m}(t)$ and $\widehat{soc}_{t\_p}(t)$ from the two feedback loops are summed with the estimated SOC of the battery $\widehat{soc}_{t\_c}(t)$ from the feedforward loop at summation block 122 to generate the final SOC estimation of the battery, $\widehat{soc}_t(t)$. The final SOC estimation of the battery, $\widehat{soc}_t(t)$, is then sent to online battery model 102, the pre-calibrated battery model 104, and an integrated battery capacity estimation system at block 124, which updates an estimated capacity of the battery 22. The updated estimated charge capacity of the battery 22 is then sent from the integrated battery capacity estimation system at block 124 to the online battery model 102, the pre-calibrated battery model 104, and the feedforward loop at block 112 in order to update the estimated battery capacity for each model.

From the control point of view, the coulomb-counting based feedforward loop allows for a quick response in updating the estimated battery SOC based on the input current i(t) from the battery 22. However, the estimated SOC from the feedforward loop st(t) may not be accurate due to error in the measured battery current i(t), an inaccurate initial battery SOC value, and/or an inaccurate estimated battery capacity value. The first feedback loop generates the first correction factor $\widehat{soc}_{t\_m}(t)$, which attenuates the initial SOC estimation error and provides a robust SOC estimation with respect to noisy measures and modeling errors by an automatic adjustment from controller 114.

The online battery model 102 in the first feedback loop, however, is an approximate model for real battery characteristics and is based on some assumptions and approximations. Therefore, the online battery model 102 may not fully represent the behavior of the battery 22, such as a quick voltage drop of the battery 22 at lower SOC ranges or the diffusion behavior of the battery 22 at extreme low temperatures. Also, the online battery model 102 may not fully cover the nonlinearity, uncertainty, and time-varying characteristics of the battery 22.

The pre-calibrated battery model 104 provides an optimal solution to deal with model uncertainty and nonlinearity. It can be trained or calibrated off-line by using input and output test data captured from vehicle and lab tests, and then used online in the vehicle 10. Its inputs include the measured current i(t), the final SOC estimation of the battery, $\widehat{soc}_t(t)$, and battery temperature T(t). Other inputs that affect the battery characteristics may also be included. The output variable of the pre-calibrated battery model 104 is the estimated battery voltage $\hat{v}_p(t)$. The difference $\Delta\hat{v}(t)$ between the estimated battery voltage $\hat{v}_p(t)$ obtained from pre-calibrated battery model 104 and the estimated battery voltage $\hat{v}_m(t)$ obtained from the online battery model 102 is fed into the second feedback loop to generate the second correction factor $\widehat{soc}_{t\_p}(t)$. The second correction factor $\widehat{soc}_{t\_p}(t)$ operates to improve the estimation error in the estimated SOC of the battery 22 that may be caused by the online battery model 102. The pre-calibrated battery model 104 may be trained based on test data. The accuracy of the pre-calibrated battery model 104 increases as the amount of test data increases and as the range of the test data increases to cover the operation and battery health of life (HOL) ranges for all input variables.

The control system 200 for estimating the capacity of the battery, Q(t), is shown as block 124 in FIG. 2. From the coulomb counting equation (2), the following relationships may be defined by equations (3) and (4):

$$x(t)=1/Q(t) \quad (3)$$

$$y(t)=\widehat{soc}_t(t) \quad (4)$$

The state variable x(t) and measurement noise of y(t) are considered in the battery capacity Q(t) estimation. Thus, the actual battery capacity can be defined as the following discrete state-space equation based on equation (4):

$$x(k+1)=x(k)+\Delta x(k) \quad (5)$$

$$y(k+1)=y(k)+(x(k)+\Delta x(k))\Delta T i(k)+v(k) \quad (6)$$

where $\Delta x(k)$ is state uncertainty, v(k) is the unknown measurement noise, and $\Delta T$ is sampling time. The goal is to design an estimator to estimate x(k) in the effect of state uncertainty and measurement noise.

For the actual system (i.e., equations (3) and (4)), we can design the following estimator to estimate the battery capacity x(t)=1/Q(t):

$$\hat{x}(k+1)=\hat{x}(k)+K[\hat{y}(k)-y(k)] \quad (7)$$

where $\hat{x}(k)$ is the estimated variable of x(t)=1/Q(t), K is the gain of observer, and the estimator output is $\hat{y}(k)$. As a result, the on-line battery capacity estimation $\hat{Q}(t)$ may be determined by using estimator equation (7), which depends on the final SOC estimation of the battery $\widehat{soc}_c(t)$.

Figure 3:
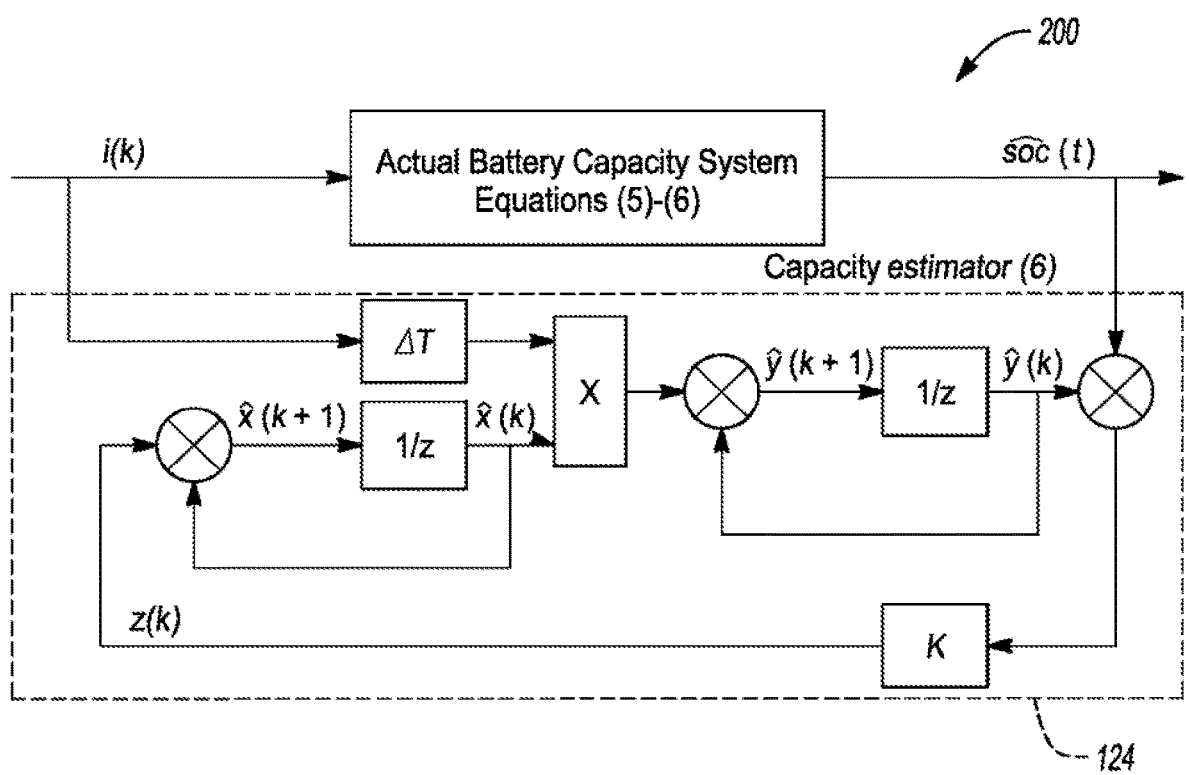
FIG. 3 is a block diagram illustrating a control system for estimating the capacity in the vehicle battery.

FIG. 3 is a block diagram illustrating the capacity estimation including the estimated system (5) and (6), and estimator (7). The battery capacity Q(t) may be estimated online by using the estimated battery SOC, $y(t)=\widehat{soc}_c(t)$, as input. State estimation methods that may be utilized to determine battery capacity Q(t), may include the online calculation, an extended Kalman filter (EKF), or a robust H infinity filter state estimator.

The battery capacity estimation $\hat{Q}(t)$ may be monitored and compared to the value used in from coulomb counting calculation. If the battery capacity estimation $\hat{Q}(t)$ decreases to lower than a predetermined value, the battery capacity value used in coulomb counting calculation may be updated with a new estimated value that is determined according to control system 200. If the battery capacity is used as one of the parameters, in the pre-calibrated battery model 104 and the online battery model 102, the battery capacity may also be updated when the battery capacity estimation $\hat{Q}(t)$ decreases to lower than a predetermined value.

All of the methods, flowcharts, block diagrams, graphs, etc. described herein and depicted in any of the FIGS. 2-3 may be stored as control logic and/or an algorithms within the controller 32. The controller 32 may implement the methods, flowcharts, block diagrams, graphs, etc. described herein by controlling the various components of the vehicle 10.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
a battery having a state of charge;
an electric machine configured to draw electrical power from the battery to propel the vehicle in response to an acceleration request and to deliver electrical power to the battery to recharge the battery; and
a controller programmed to,
adjust an estimation of the battery state of charge based on a feed forward control, wherein the feed forward control includes a coulomb counting algorithm that adjusts the estimation of the state of charge of the battery based on a measured current flowing in and out of the battery,
adjust the estimation of the battery state of charge based on a first feedback control that includes a first battery model that outputs a first estimated voltage of the battery based on a current state of charge of the battery, wherein the first feedback control adjusts the estimation of the battery state of charge based on a difference between a measured voltage of the battery and the first estimated voltage of the battery,
adjust the estimation of the battery state of charge based on a second feedback control that includes a second battery model that outputs a second estimated voltage of the battery based on the current state of charge of the battery, a temperature of the battery, and the measured current flowing in and out of the battery, wherein the second feedback control adjusts the estimation of the battery state of charge based on a difference between the first estimated voltage of the battery and the second estimated voltage of the battery, and
control the electrical power flow between the battery and the electric machine based on the estimation of the state of charge of the battery.

2. The vehicle of claim 1, wherein the first battery model is a Kalman filter.

3. The vehicle of claim 1, wherein the second battery model is based on training a neural network to test data.

4. The vehicle of claim 3, wherein the neural network is a nonlinear autoregressive network with exogenous variables.

5. The vehicle of claim 1, wherein the controller is further programmed to, update an estimated battery capacity based on an estimator algorithm that compensates for state uncertainty and measurement noise.

6. A vehicle comprising:
a battery having a state of charge;
an electric machine configured to draw electrical power from the battery to propel the vehicle in response to an acceleration request and to deliver electrical power to the battery to recharge the battery; and
a controller programmed to,
adjust an estimation of the battery state of charge according to a feed forward control that adjusts the estimation of the state of charge of the battery based on a measured current flowing in and out of the battery,
adjust the estimation of the battery state of charge based on a first feedback control that adjusts the estimation of the battery state of charge based on a difference between a measured voltage of the battery and a first estimated voltage of the battery,
adjust the estimation of the battery state of charge based on a second feedback control that adjusts the estimation of the battery state of charge based on a difference between the first estimated voltage of the battery and a second estimated voltage of the battery, and
control the electrical power flow between the battery and the electric machine based on the estimation of the state of charge of the battery.

7. The vehicle of claim 6, wherein the feed forward control includes a coulomb counting algorithm that adjusts the estimation of the state of charge of the battery based on the measured current flowing in and out of the battery.

8. The vehicle of claim 6, wherein first feedback control includes a battery model that outputs the first estimated voltage of the battery based on a current state of charge of the battery.

9. The vehicle of claim 8, wherein the battery model is a Kalman filter.

10. The vehicle of claim 6, wherein second feedback control includes a battery model that outputs a second estimated voltage of the battery based on the current state of charge of the battery, a temperature of the battery, and the measured current flowing in and out of the battery.

11. The vehicle of claim 10, wherein the battery model is based on training a neural network to test data.

12. The vehicle of claim 11, wherein the neural network is a nonlinear autoregressive network with exogenous variables.

13. The vehicle of claim 6, wherein the controller is further programmed to, updated an estimated charge capacity of the battery based on an estimator algorithm that compensates for state uncertainty and measurement noise.

14. A vehicle comprising:
a battery having a state of charge;
an electric machine configured to draw electrical power from the battery to propel the vehicle in response to an acceleration request and to deliver electrical power to the battery to recharge the battery; and
a controller programmed to,
adjust an estimation of the battery state of charge based on a feed forward control that includes a coulomb counting algorithm, a first feedback control that includes a first battery model, and a second feedback control that includes a second battery model, wherein (i) the first battery model outputs a first estimated voltage of the battery based on a current state of charge of the battery, (ii) the first feedback control adjusts the estimation of the battery state of charge based on a difference between a measured voltage of the battery and the first estimated voltage of the battery, (iii) the second battery model outputs a second estimated voltage of the battery based on the current state of charge of the battery, a temperature of the battery, and the measured current flowing in and out of the battery, and (iv) the second feedback control adjusts the estimation of the battery state of charge based on a difference between the first estimated voltage of the battery of and the second estimated voltage of the battery, and
control the electrical power flow between the battery and the electric machine based on the estimation of the state of charge of the battery.

15. The vehicle of claim 14, wherein the feed forward control adjusts the estimation of the state of charge of the battery based on a measured current flowing in and out of the battery.

16. The vehicle of claim 15, wherein the feed forward control includes a coulomb counting algorithm that adjusts the estimation of the state of charge of the battery based on the measured current flowing in and out of the battery.

17. The vehicle of claim 14 wherein the first battery model is a Kalman filter.

18. The vehicle of claim 14, wherein the second battery model is based on training a neural network to test data.

* * * * *